United States Patent [19]
Lin et al.

[11] Patent Number: 5,742,599
[45] Date of Patent: Apr. 21, 1998

[54] METHOD AND SYSTEM FOR SUPPORTING CONSTANT BIT RATE ENCODED MPEG-2 TRANSPORT OVER LOCAL ATM NETWORKS

[75] Inventors: Mengjou Lin, San Jose; Alagu Periyannan, Aptos; David Singer, San Francisco, all of Calif.

[73] Assignee: Apple Computer, Inc., Cupertino, Calif.

[21] Appl. No.: 606,602

[22] Filed: Feb. 26, 1996

[51] Int. Cl.[6] ............................................ H04L 12/56
[52] U.S. Cl. ............................................ 370/395; 370/476
[58] Field of Search .................................... 370/389, 391, 370/392, 395, 396, 464, 465, 466, 467, 473, 358, 401, 402, 470, 471, 472, 476, 486, 509, 512, 521, 522; 380/20, 10; 348/10, 12, 8, 6, 461, 460, 467, 469

[56] References Cited

U.S. PATENT DOCUMENTS

| 5,544,161 | 8/1996 | Bishan et al. | 348/12 |
| 5,583,864 | 12/1996 | Lightfoot et al. | 370/396 |

*Primary Examiner*—Dang Ton
*Attorney, Agent, or Firm*—Sawyer & Associates

[57] ABSTRACT

A system and method for supporting constant bit rate encoded MPEG-2 transport over local Asynchronous Transfer Mode (ATM) networks. The present invention encapsulates constant bit rate encoded MPEG-2 transport packets, which are 188 bytes is size, in an ATM AAL-5 Protocol Data Unit (PDU), which is 65,535 bytes in size. The method and system includes inserting a plurality of MPEG-2 transport packets into a single AAL-5 PDU, inserting a segment trailer into the ATM packet after every two MPEG packets, and then inserting an ATM trailer at the end of the ATM packet. In a preferred embodiment, 10 or 12 MPEG-2 transport packets are packed into one AAL-5 PDU to yield a throughput 70.36 and 78.98 Mbits/sec, respectively, thereby supporting fast forward and backward playing of MPEG-2 movies via ATM networks.

19 Claims, 8 Drawing Sheets

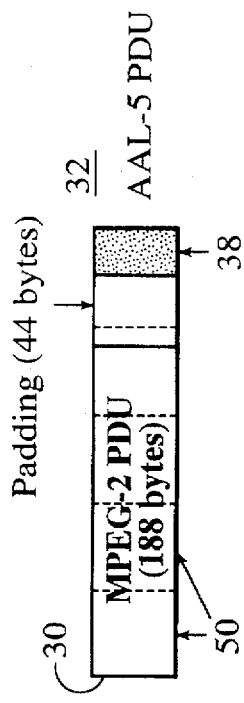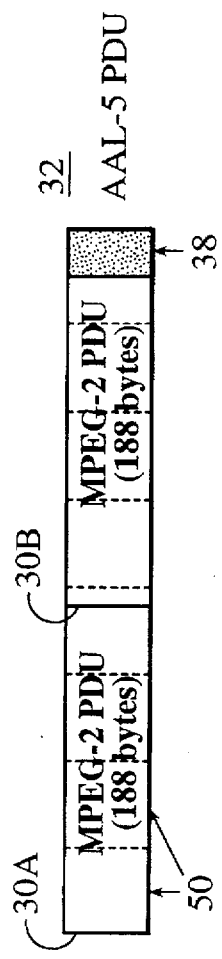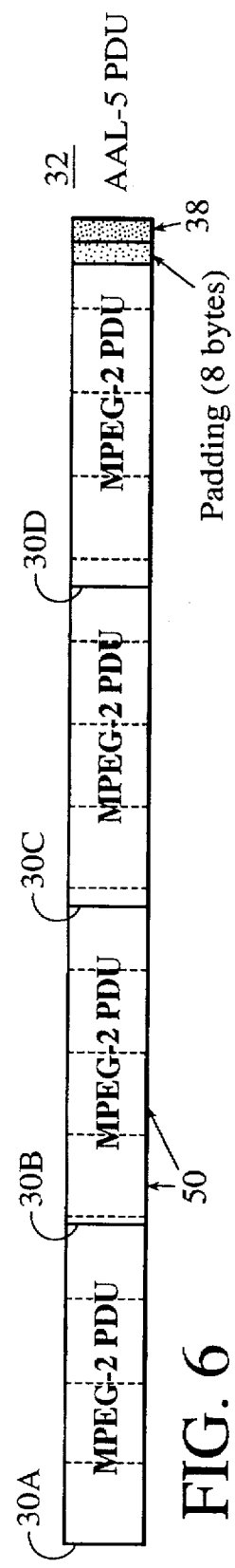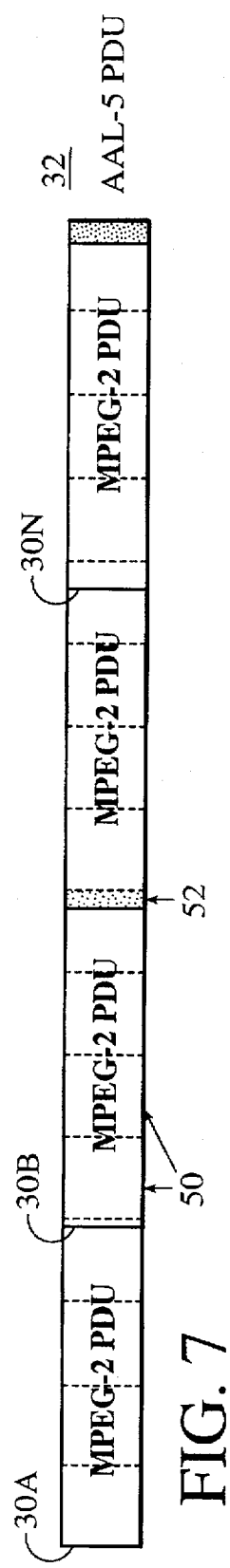
FIG. 4 (PRIOR ART)
FIG. 5 (PRIOR ART)
FIG. 6 (PRIOR ART)
FIG. 7

METHOD AND SYSTEM FOR SUPPORTING CONSTANT BIT RATE ENCODED MPEG-2 TRANSPORT OVER LOCAL ATM NETWORKS

FIELD OF THE INVENTION

The present invention relates to a method and system for supporting constant bit rate encoded MPEG-2 transport over local Asynchronous Transfer Mode (ATM) networks, and more particularly to a method and system for encapsulating MPEG-2 transport packets in an ATM Protocol Data Unit.

BACKGROUND OF THE INVENTION

The quality of video expected by users today requires very large network transmission speeds. For example, uncompressed speeds of broadcast-quality NTSC (National Television Systems Committee) video is about 120 Mbits/sec and 216 Mbits/sec, respectively. The required network bandwidth is more than traditional data networks can handle. Fortunately, recent advances in compression techniques can take advantage of characteristics (or limitations) of the human visual system, to achieve lossy, yet visually loss less, compressed still images and full-motion video.

The Moving Picture Experts Group (MPEG) standard was designed to support full motion video stored on digital storage media at compression ratios up to 200 to 1. MPEG development is divided into two distinct phases, MPEG-1 and MPEG-2. MPEG-1 is intended for image resolutions of approximately 360 pixels×240 lines and bit rates of about 1.5 Mbits/sec, for both video and a pair of audio channels. MPEG-2 is for higher resolutions (including but not restricted to interlaced video) and higher bit rates (up to 20 Mbits/sec).

The MPEG standard is further segmented into four parts, systems, video, audio, and conformance testing. The systems part defines a multiplexed structure for combining audio and video data and means of representing the timing information needed to replay synchronized sequences in real-time. For MPEG-2, the system coding was specified in two forms: Program Streams and Transport Streams. The Program Stream is designed for use in relatively error-free environments and is suitable for applications which may involve software processing of system information such as interactive multimedia applications.

The Transport Stream is for use in environments where errors are likely, such as in networks, for example. The Transport Stream combines one or more programs with one or more independent time bases into a single stream. The Transport Stream utilizes 188-byte transport packets that can be encoded into constant bit rate (CBR) or variable bit rate (VBR) streams. Thus, the method for packing CBR or VBR encoded MPEG-2 transport packets over underlying high speed networks becomes an important factor for efficiently delivering MPEG-2 movies across the networks.

An emerging multimedia networking standard is called Asynchronous Transfer Mode (ATM). The ATM protocol was developed by various organizations and standard groups including the Telecommunication Standardization Sector of International Telecommunication Union (ITU-T, previously CCITT) which specifies the network layer protocol of future broadband networks (B-ISDNs).

ATM specifies a fast cell switched network where data is fragmented into fixed-size 53 byte cells, and routed through the network by way of packet switches and links. ATM is expected to serve as the transport network for a wide spectrum of traffic types with varying performance requirements. Using the statistical sharing of network resources (e.g. bandwidth, processing buffers, etc.), ATM is expected to efficiently support multiple transport rates from multiple users with stringent requirements on loss, end-to-end delay, and cell-interarrival variation. Even though the ATM standard was initially developed and intended to serve as an infrastructure for wide-area (telecommunications) networks, it is currently being much more rapidly adopted for local area network computing.

The ATM protocol is divided into several layers, which includes the ATM layer and the ATM Adaptation Layer (AAL). The ATM layer is a unique layer that carries all the different classes of services supported by B-ISDN (Broadband Integrated Services Digital Network) within the 53-byte cells.

ATM was intended for the support of multiple classes of service, i.e., classes of traffic with varying quality of service parameters such as cell loss, delay, cell inter-arrival times, and data transfer rates. These parameters reflect the varying types of traffic ATM was intended to support, such as connection-oriented traffic types (e.g., audio), connectionless traffic types (e.g., file transfers), etc.

The ATM layer specifies four service layers within the AAL layer: AAL type 1, AAL type 2, AAL type 3 and 4, and AAL type 5. AAL-1 provides connection-oriented service with constant bit rate support, while AAL-2 provides the same service with variable bit rate support. AAL-¾ is for both connection-oriented and connectionless service with variable bit rate support.

To reduce the high complexity of AAL-¾, the AAL-5 protocol has been adopted. The AAL-5 protocol transmits data within 65,535-byte packets called Protocol Data Units (PDUs). The purpose of the AAL layer is to provide a link between the services required by higher network layers and the generic ATM cells used by the ATM layer. The AAL-5 protocol provides a simple and efficient ATM adaptation layer that can be used for bridged and routed PDU's. It required a change to the cell to identify end of frame in support of connection-oriented connection.

Because of the recent proliferation of AAL-5, there has been a desire to encapsulate constant bit rate encoded MPEG-2 transport packets within the ATM AAL-5 protocol. However, there is a mismatch of size between MPEG-2's transport packets, which are 188-bytes, and ATM AAL-5's PDUs that are up to 65,535-bytes.

Basically, two schemes have been proposed to pack MPEG-2 transport packets onto one AAL-5 PDU. One scheme, called 1TP, packs one MPEG-2 transport packet into one AAL-5 PDU. Another scheme, called 2TP, packs two MPEG-2 transport packets into one AAL-5 PDU.

Most software-based systems, such as video-on-demand servers or desktop systems, achieve their best throughput on the largest PDUs having several kilobytes of data. In both the 1TP and 2TP schemes, however, too little data is packed in the AAL-5 PDU for efficient management by software-based systems. This is because for small PDU sizes, software and hardware overhead per PDU is large and usually dominates communication performance. The software overhead stems from operating system scheduling, memory locking/copying, interrupt handling, and protocol processing, while hardware overhead involves firmware interrupt, data movement across I/O buses, and interface card preprocessing.

Due to system overhead, the 1TP and 2TP schemes are incapable of supporting high-speed network media, such as ATM networks, in video-on-demand environments. What is needed therefore is an improved scheme for encapsulating MPEG-2 transport packets onto a single AAL-5 Protocol Data Units. The present invention addresses such a need.

SUMMARY OF THE INVENTION

The present invention provides a method and system for encoding a MPEG stream over an ATM network. The method and system comprises packing a plurality of MPEG packets into an ATM packet, inserting a segment trailer into the ATM packet after at least two MPEG packets, and inserting an ATM trailer at the end of the ATM packet.

A preferred embodiment of the present invention includes packing 10 or 12 MPEG-2 transport packets into one ATM packet to yield a throughput 70.36 and 78.98 Mbits/sec, respectively, thereby supporting fast forward and backward playing of MPEG-2 movies via ATM networks. According to the system and method disclosed herein, the packing scheme of the present invention yields better end-to-end performance than conventional 1TP and 2TP packing schemes, yields better error recovery capability than a nTP-Tight scheme, and has the same buffer requirements as the 2TP scheme.

BRIEF DESCRIPTION OF THE DRAWINGS

FIGS. 4 and 5 are block diagrams illustrating conventional methods for encapsulating MPEG-2 transport packets in an AAL-5 PDU.

FIG. 6 is a block diagram depicting an example of a NTP-tight packing scheme.

FIG. 7 is a block diagram depicting an example of a NTP-Loose packing scheme of the present invention.

DESCRIPTION OF THE INVENTION

The present invention relates to an improvement in supporting MPEG-2 data over ATM networks. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Two dominant factors control the efficiency of information transfer over a multimedia network. First is the requirement of an effective compression standard for continuous video and audio. Second is the installation of high-speed networks with guaranteed quality of service which may include real-time support, bounded frame variation, and error resilience.

Figure 1:
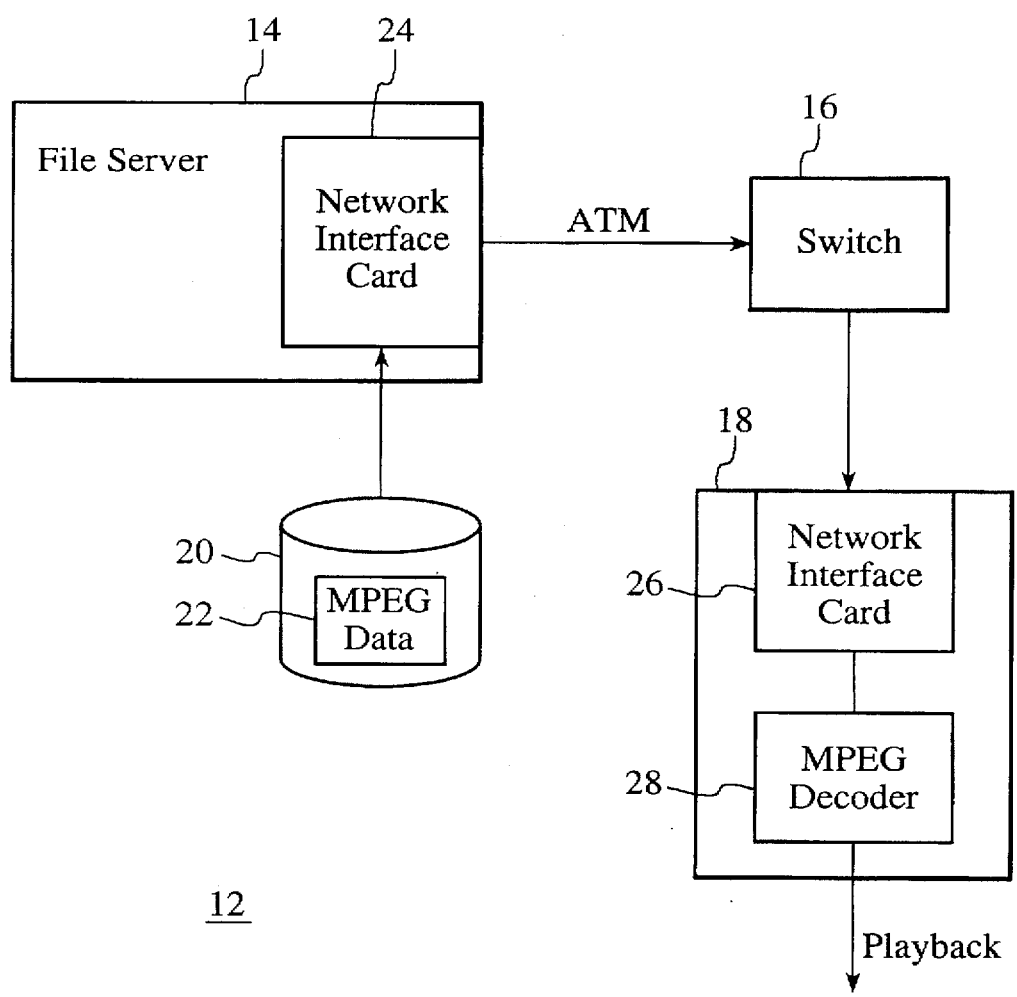
FIG. 1 is a block diagram illustrating a high-speed multimedia network system that utilizes the MPEG-2 compression standard in conjunction with the Asynchronous Transfer Mode (ATM) network protocol.

FIG. 1 is a block diagram illustrating a high-speed multimedia network system 12 that utilizes the MPEG-2 compression standard in conjunction with the Asynchronous Transfer Mode (ATM) network protocol. The network 12 comprises a file server 14, a switch 16, and a client computer 18. The function of the file server 14 is to provide audio and video data to the requesting client 18. The network system 12 is capable of supporting distributed multimedia applications, such as video-on-demand, video conferencing, distance learning, and telemedicine.

The file server 14 includes one or more high-capacity disks 20 for storing MPEG data 22. As mentioned previously, video transmission is extremely bandwidth intensive. Thus, sophisticated compression algorithms have been developed that are able to provide high quality, constant image quality video. The MPEG-1 and MPEG-2 standards are briefly described below.

MPEG-1 defines a bit stream for compressed video and audio optimized to fit into a data rate of about 1.5 Mbits/sec. MPEG video compression is based upon exploiting temporal redundancy (moving image compression) as well as spatial redundancy. Moving image compression techniques predict frames in the temporal domain, and then use DCT's (Discrete Cosine Transform's) to organize the redundancy for the spatial domain. A MPEG data stream usually consists of four types of coded frames.

The first type is called I frames (intra frames), which are coded as still images, and do not rely on any previous frames. The second type of coded frame is called P frames (predicted frames), which are predicted from the most recently constructed I or P frame (from the point of view of the decompressor). Each macroblock (8×8 pixels) in a P frame can either come with a vector and difference DCT coefficients for a close match to the last I or P frame, or, if an adequate match does not exist, it can be intra coded (as in I frames). The third type of frame are B frames (bidirectional frames), which are predicted from the close two I or P frames, one from the past and one from the future. The fourth type is D frames containing only the DC (8×8 block average) for each block. Support for this category of frames is optional, and sequences may not contain D frames intermixed with their types of frames. A typical sequence of MPEG frames resembles: "IBBPBBPBBPBBIBBP . . . ," where the I frames are usually much larger than that of B and P frames.

In MPEG, there are two parameters which may be varied by a user. The first is the quantization factor, the second is the interframe to interframe ratio, i.e., the number of frames in a period divided by the number of I frames. These parameters are of interest because they allow the user to specify the visual quality, as well as allow the user to indirectly specify the bit rate characteristics of the MPEG stream.

MPEG-2 is the second phase of the MPEG. It deals with the high-quality coding of possible interlaced video, of either standard or High-Definition Television (HDTV). A wide range of applications, bit rates, resolutions, signal qualities and services are addressed, including all forms of digital storage media, television, broadcasting and communications.

The MPEG-2 main profile baseline is intended to be suitable for use of the largest number of initial applications in terms of functionality and cost constraints. It supports bit rates up to 20 Mbits/sec over computer networks, satellite and other broadcast channels. The basic compression techniques used in MPEG-2 are similar to those used in MPEG-1. As stated above, the system coding of MPEG-2 has two forms: Program Streams and Transport Streams. The Transport Streams further include a series of MPEG-2 transport packets.

Figure 2:
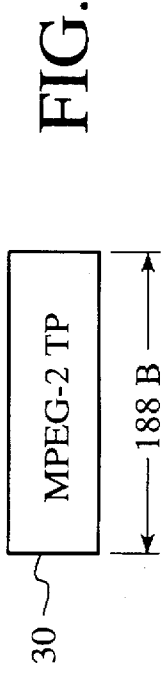
FIG. 2 is a block diagram illustrating a MPEG-2 transport packet, which is 188 bytes in length.

FIG. 2 is a block diagram illustrating a MPEG-2 transport packet 30, which is 188 bytes in length. Each transport packet 30 can be encoded into constant bit rate (CBR) or variable bit rate (VBR) streams. Synchronization among multiple elementary streams is affected by the presentation time stamps in Program and Transport Streams. The time stamp associated with Transport streams is called Program Clock Reference (PCR) (not shown). PCR is defined as the intended arrival time of the byte containing the last bit of the PCR base.

Referring again to FIG. 1, in a preferred embodiment, MPEG data 20 stored in the disk 20 are MPEG-2 transport streams. There are some major reasons for using MPEG-2 transport streams within the frame structure of a network technology, such as in ATM networks 12. First, the MPEG-2 transport stream is well-defined in the MPEG-2 standard and is designed for use in environment where errors are likely, such as storage or transmission in lossy or noisy media. Transmission via computer networks, e.g., ATM network 12, belongs to this category.

Second, the transport stream combines one or more video and audio programs with (possibly) different time bases into one single stream. Timing and program blocking information of different programs is incorporated within each transport stream. There is no additional synchronization required beyond the single transport stream.

Finally, most manufactures of MPEG-2 decoders 28 implement the MPEG-2 transport stream in their chipsets. It is expected that MPEG-2 transport stream will become the major way to deliver MPEG-2 data via networks.

MPEG-2 transport packets 30 can be mapped into ATM networks 12 in different ways. For example, mapping transport packets 30 into Internet Protocol (IP) retains the MPEG data when dealing with missing segments. However, the major concern is the additional delay caused by protocol processing of higher ATM layers. The major requirement for applications, such as video-on-demand, is real-time delivery, instead of reliability.

Therefore, a preferred embodiment of the invention considers encapsulating MPEG-2 transport packets over ATM networks 12 that directly use the AAL framing protocols. Both the file server 14 and the client 18 are equipped with ATM network interface cards 24 and 26, respectively, that utilize the ATM AAL-5 protocol.

The ATM AAL-5 protocol layer can be divided into two sub-layers: the segmentation and reassembly sub-layer (SAR), and the convergence sub-layer, which are implemented in the network interface cards 24 and 26. The ATM card 24 in the file server 14 first formats the MPEG-2 transport packets 30 from the disk 20 into the ATM AAL-5 protocol using the method of the present invention, as described below. Next, the ATM card 24 uses the SAR sub-layer to segment the typically large data packets from the ATM higher layer AAL-5 into ATM cells. The individual cells are then transmitted to the ATM switch 16 where they are routed to the appropriate client 18.

At the receiving client 18, the inverse operation is performed. The ATM cells are recombined into larger AAL-5 PDUs, and the MPEG-2 transport streams are then extracted from the AAL-5 PDU. The client 18 also includes a MPEG-2 decoder 28 that decodes the MPEG-2 transport streams for playback to a viewer.

In a preferred embodiment of the present invention, the file server 14 and the client 18 comprise Power Macintosh (8100/80) computers or their equivalents, and the interface cards 24 and 26 comprise Fore Systems's NBA-200 ATM interface cards (200 series ATM cards for NuBus-based Macintosh computers) that include modified ATM driver software. ATM is independent of any particular physical layer, but is most commonly associated with Synchronous Optical Network (SONET). Therefore, in a preferred embodiment, the switch 16 is a ASX-100 Fore switch, which in an optical network, may provide an aggregate throughput of 2.4 Gbits/sec.

ATM includes a convergence sub-layer (CS) that is service-dependent and may perform functions like message identification and time/clock recovery according to the specific services. For example, AAL-1 and AAL-2 require special time/clock treatment, which is handled by the CS. For AAL-5, the CS has been subdivided into the Common Part CS (CPCS), and the Service Specific CS (SSCS). The CPCS functions make use of a CPCS-PDU (Protocol Data Unit), which as used herein, refers to the AAL-5 PDU.

Figure 3:
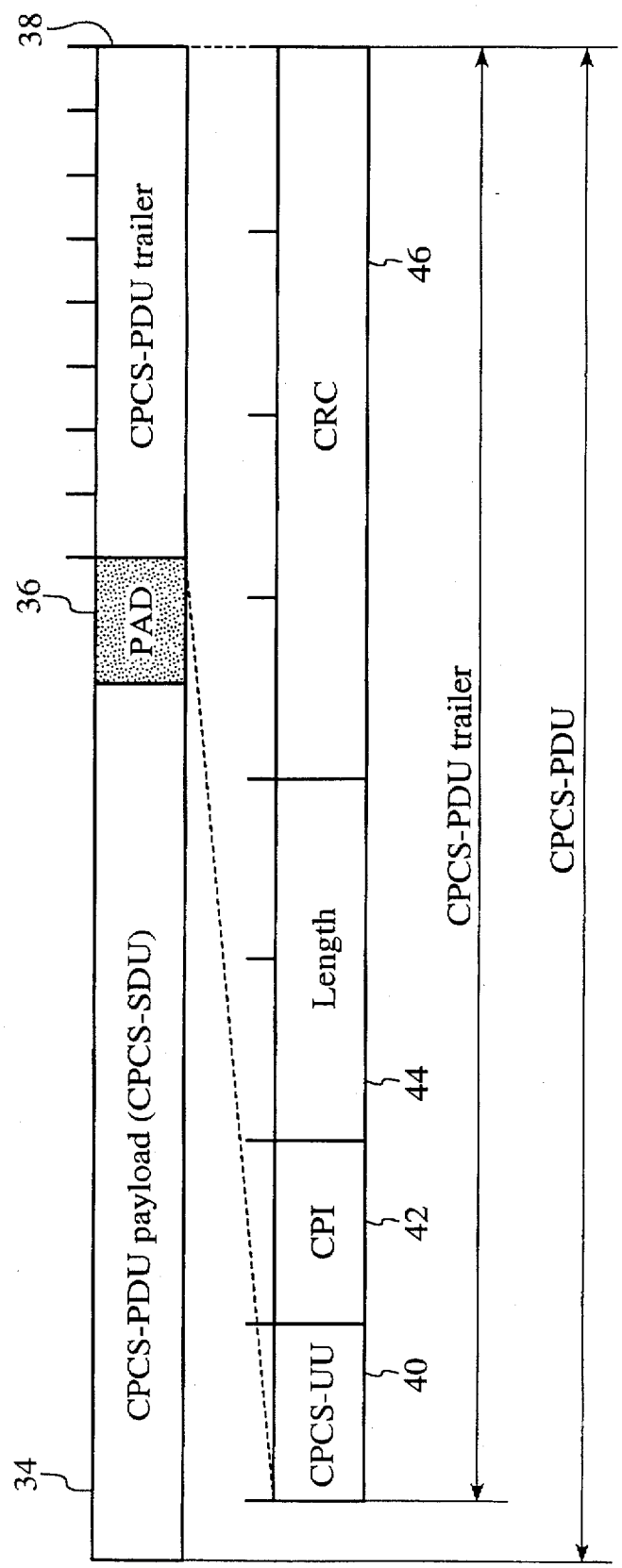
FIG. 3 is a block diagram of a detailed layout of an AAL-5 PDU.

FIG. 3 is a block diagram of a detailed layout of an AAL-5 PDU. The AAL-5 PDU 32 comprises an AAL-5 PDU payload 34, a padding field 36, and an eight octet AAL-5-PDU trailer 38. The AAL-5 PDU payload 34 can range from 1 to 65,535 octets in length. The padding field 36 ranges from zero to forty-seven unused octets. They are strictly used as filler octets and do not convey any information.

The AAL-5-PDU trailer 38 includes a CPCS-UU field 40, A CPI field 42, a length field 44, and a Cyclic Redundancy Check (CRC) field 46. The CPCS-UU field 40 is used to transparently transfer AAL-5 user-to-user information. One of the functions of the CPI field 42 is to align the AAL-5 trailer 38 to sixty-four bytes. Other functions are also possible. The CRC 46 is used to detect bit errors in the AAL-5-PDU.

There are several reasons for choosing the AAL-5 protocol for carrying CBR encoded MPEG-2 streams. First, is the wide availability of the AAL-5 protocol on most ATM interface cards 24 and 26. Second, because the AAL-5 layer does not provide timing information, MPEG-2 synchronization schemes can be used to provide a constant bit rate service on top of ATM AAL-5. Thus, there is no redundant timing information carried via networks. Third, de-jittering at the network interface card 26 of the client 18 is not required. It has been shown that significant jitter can be handled by the clock recovery loop of the MPEG-2 decoder 28. Therefore, the de-jittering buffer and the clock recovery buffer can be merged into a single buffer.

Referring to both FIGS. 2 and 3, there has been much discussion of the use of AAL-5 for carrying unidirectional MPEG-2 Transport Streams. Conventional methods for packing small (188 bytes) MPEG-2 transport packets 30 into an AAL-5 PDU 32 has focused mostly on the efficient use of available bandwidth.

FIGS. 4 and 5 are block diagrams illustrating conventional methods for encapsulating MPEG-2 transport packets 30 in an AAL-5 PDU 32. FIG. 4 illustrates a 1TP (1-Transport-Packet) Scheme, which packs a single MPEG-2 transport packet 30 into one AAL-5 PDU 32. FIG.

5 illustrates a 2TP (2-Transport-Packet) Scheme, which packs two MPEG-2 transport packets 30A and 30B into one AAL-5 PDU 32.

Since the AAL-5 trailer 38 is eight bytes, the most common solution is to pack one or two transport packets 30 into one AAL-5 PDU 32. Referring to FIG. 4, packing one 188-byte MPEG-2 transport packet 30 into one AAL-5 PDU 32 requires five ATM cells 50 (shown by the dotted lines), where the fifth cell 50 is not entirely used and is filled with forty-four bytes of padding.

Referring to FIG. 5, packing two MPEG-2 transport packets 30 (376-bytes) into one AAL-5 PDU 32 requires eight ATM cells 50 with no padding. In both the 1TP and 2TP packing schemes, the ATM cells 50 in the AAL-5 PDU 32 are followed by the AAL-5 trailer 38. When considering packing efficiency, the 2TP scheme of packing two transport packets 30 achieves better performance.

However, an AAL-5 PDU 32 having only one or two MPEG-2 transport packets 30 is very small for efficient management by software-based systems (such as video-on-demand servers or desktop systems). Most software-based systems achieve their best throughput on the largest PDU 32 they can handle; typically sizes of several kilobytes are required.

Also, larger PDU sizes achieves better network performance than small PDU sizes. This is because small PDU sizes results in large software and hardware overhead per PDU. Software overhead includes operating system scheduling, memory locking/copying, interrupt handling, and protocol processing. Hardware overhead involves firmware interrupt, data movement across the I/O bus, and interface card preprocessing. For example, end-to-end delay across ATM and Fiber Channel have been reported on the order of several milliseconds. For high speed network media such as ATM networks 12 to be effective, these times must be reduced.

Therefore, there have been suggestions that larger PDUs should be permissible, i.e., one AAL-5 PDU 32 carrying more than two MPEG-2 transport packets 30. The result is a third packing scheme, called nTP-tight, which tightly packs (n) MPEG-2 transport packets 30 into one AAL-5 PDU 32. The nTP-tight packing scheme results in an AAL-5 PDU 32 that has n×188-bytes and requires (n×188+8)/48 ATM cells 50.

FIG. 6 is a block diagram depicting an example of the nTP-tight packing scheme in which four MPEG-2 transport packets 30A–30D are tightly packed into one AAL-5 PDU 32. This is referred to as a 4TP-Tight packing scheme.

Although the nTP-tight packing scheme may reduce overhead, the scheme does not adequately address several issues. The first issue that is not addressed is how many (n) transport packets are needed to be packed in one AAL-5 PDU 32 to achieve better network performance? The choice may depend on an application's required quantity of service (QOS), the hardware platform, and the software platform.

The second issue relates to error recovery. In the event of line errors (bit error, cell loss, cell misinsertion), a whole AAL-5 PDU 32 (or, occasionally, two) is lost. Increasing the PDU size increases the dropout size at the receiving client 18 (FIG. 1).

Another issued raised by the nTP-tight packing scheme is that in AAL-5, data cannot normally be acted upon until the receipt of the final checksum, i.e., CRC 46. Increasing the PDU size increases the buffering requirements at the receiving client 18, which is potentially a problem for hardware-based receiver/decoders 28.

The present invention is an improved method for encoding MPEG-2 transport stream over an ATM network, in which (n) MPEG-2 transport packets 30 are packed into one AAL-5 PDU, with an additional 8-byte segment trailer 52 inserted after every two transport packets 30. The improved packing method of present invention is referred to as the nTP-Loose (n-Transport-Packet-Loose-Packed) scheme. The nTP-Loose scheme of the present invention provides (1) improved end-to-end performance than schemes 1TP and 2TP, (2) better error recovery capability than scheme nTP-Tight, and (3) same buffer requirement as the one of scheme 2TP.

FIG. 7 is a block diagram depicting an example of the nTP-Loose packing scheme in which four MPEG-2 transport packets 30 are loosely packed into one AAL-5 PDU 32, where a segment trailer 52 is inserted after every second transport packet 30. The example shown in FIG. 7 is referred to as a 4TP-Loose packing scheme.

Referring to FIGS. 3 and 7, each intermediate segment trailer 52 in the PDU 32 is formatted like an AAL-5 trailer 38, including the running length 44 and CRC 46, just as if this were the actual end of the PDU 32. At the end of the PDU 32 itself, the normal AAL-5 trailer 38 is inserted, and an end-of-PDU indicator (not shown) is set in a cell header.

There are distinct advantages to nTP-Loose scheme over other packing schemes. First, every second transport packet 30 starts at a cell boundary; thus re-syncing is much easier in the case of cell loss. Second, in this scheme, software receivers can receive the whole PDU 32 and ignore the intermediate CRCs and counts. Hardware receivers can stream the cells 50 into a unit which checks the intermediate CRCs, counts, and MPEG sync-byte if desired, and recover the transport packets 30 as they arrive (in bunches of two at a time). Note, it should be permissible to transmit the CRC 46 in the intermediate segment trailers 52 as zero, disabling (some of) the checks in the receiver.

With the nTP-Loose scheme, developers can set much more relaxed bounds on the PDU size; large enough to get decent software performance, and small enough not to require excessive software buffering (or excessive drop-out when data loss occurs on the way to a software receiver).

The nTP-Loose scheme also enables hardware decoders to recover from errors with comparable performance to the 2TP scheme, described further below.

The disadvantage of the nTP-Loose scheme is the additional requirement of hardware logic for segment trailer 52 within segmentation and reassembly sublayer. However, it is believed this support of hardware logic will enable the nTP-Loose scheme to achieve a high communication performance and become a cost-effective packing scheme.

The nTP-Loose scheme is comparable to the nTP-Tight scheme in which MPEG-2 transport packets 30 are placed adjacent in a PDU 32, and then followed by padding and the normal AAL-5 trailer 38. However, the following are differences in link usage.

First, PDUs 32 containing an odd number of transport packets 30 are larger; for example, three 188-byte transport packets 30 and a single 8-byte trailer 38 fit into twelve cells 50; with an extra segment trailer 52, thirteen cells 50 are needed.

In a preferred embodiment of the present invention, only even-length PDUs 32 are used because the length of the PDU 32 is the same until a PDU 32 of fourteen or more transport packets 30 is built; (fourteen packets will take fifty-six cells instead of fifty-five). Since this is a packet of 2632-bytes, the extra overhead is small (less than 2% at this size).

Referring again to FIG. 1, for best data security, the transmitting network interface card 24 should generate and insert the AAL-5 CRCs 46 into the intermediate segment trailers 52. This would normally require special hardware at the transmitter, which is a nuisance for pure software transmitters. However, a hardware decoder will probably catch most errors even with the intermediate CRCs 46 disabled and transmitted as zero (which should be permitted), as it can check this zero, the running length 44, and the sync-byte (0×47) at the head of every MPEG-2 transport packet 30.

Referring again to FIG. 3, in the AAL-5 trailer 38, the first byte is the user-user indication (UU). The first byte of an MPEG-2 transport packet 30 is fixed at 0×47. The present invention establishes a value of the UU byte for segment and final trailers 52 and 38 which distinguish them from each other and from an MPEG-2 transport packet 30.

In a preferred embodiment 0×D2 is used as the UU byte for segment trailers 52 since current equipment uses zero for final trailers, and MPEG-2 uses 0×47 as the first byte of a transport packet 30. Thus, the segment trailers 52 of the present invention which should be easily distinguishable from 0×47 in most cases of bit errors, reversals, inversions and the like. Zero is used as the user-user indication in the final trailer.

In odd-length PDUs 32, there is a 44-byte pad area between the last valid MPEG-2 packet 30 and the final AAL-5 trailer 38. Note that this pad comprises 4 bytes at the end of one cell 50, and forty bytes in the next cell, which contains only the AAL-5 trailer 38.

The decoder 28 receiving the penultimate cell needs to know whether to start a new MPEG-2 transport packet 30 with those four bytes. There are two choices to be made here: 1) whether any requirement should be put on the contents of the pad area; and 2) whether the length field 44 in the PDU trailer 38 should include any of the pad area.

The final four bytes in the penultimate cell must contain either an invalid MPEG-2 transport header (which, coincidentally, is 4 bytes), or a valid header for a null packet (on PID 0×1FFF). This requirement enables the decoder 28 to operate on that cell before it knows that the next cell is last in a PDU 32. Since low-level AAL-5 hardware may not guarantee the contents of pad areas, it should be permissible that the pad area be filled with a 44-byte MPEG transport packet 30 on the null stream (PID 0×1FFF).

If the interface card 24, which is the AAL-5 transmitter, can guarantee the contents of this pad area will not contain 0×47 or 0×D2, then the AAL-5 length 44 may be set to not include this pad area. (Note that the AAL-5 CRC 46 includes the pad area in either case). It may be worth using the CPI field 42 (the second byte of an AAL-5 trailer 38) to indicate the expected remaining length of the PDU 32, in transport packets. Thus the CPI field 42 would be zero in the actual AAL-5 trailer 38, and count down to zero in the segment trailers 52.

As stated above, one of the major advantages of the nTP-Loose scheme of the present invention is cell error recovery. In conventional 2TP and the n-TP-Tight schemes, error recovery is only possible at the level of a PDU 32. Therefore, the maximum error exposure for a single error is 4 or 2×n transport packets (in the case of loss of the final AAL-5 cell). According to the intermediate scheme of the present invention, however, error recovery may be performed at the sub-PDU level through the use of standard hardware decoders 28. Referring again to FIG. 1, three types of errors may occur while transmitting ATM cells 50 across the ATM network 12: cell loss, cell bit errors, and cell misinsertion.

As the decoder 28 receives PDUs 32, the decoder 28 determines whether a cell was lost, a cell bit error, or cell misinsertion has occurred. An error due to a lost cell may be due to a lost data cell, a cell dropped by the switch 16, a lost segment trailer 52, or a lost AAL-5 trailer 38. A bit error may occur within a data cell, the CRC 46 of a segment trailer 52, or the CRC 46 of a AAL-5 trailer 38.

After determining the type of error, the decoder 29 then determines whether the error occurred in a pure data cell 50 (i.e., a non-padded cell), a segment trailer 52, or the final cell 50 of the AAL-5 PDU 32.

Determining if and where an error occurred is accomplished by examining the CRC 46 (FIG. 3), hereinafter referred to as checksum, of both the segment trailer 52 and the AAL-5 PDU trailer 38. In a preferred embodiment, the decoder 28 general treats checksum errors by resetting the running checksum in the decoder 28 to the received checksum in the case of errors. Only in the case of bit errors in the actual received checksum is this a mistake; otherwise, this allows for mid-PDU recovery from data bit errors and cell loss.

Figure 8:
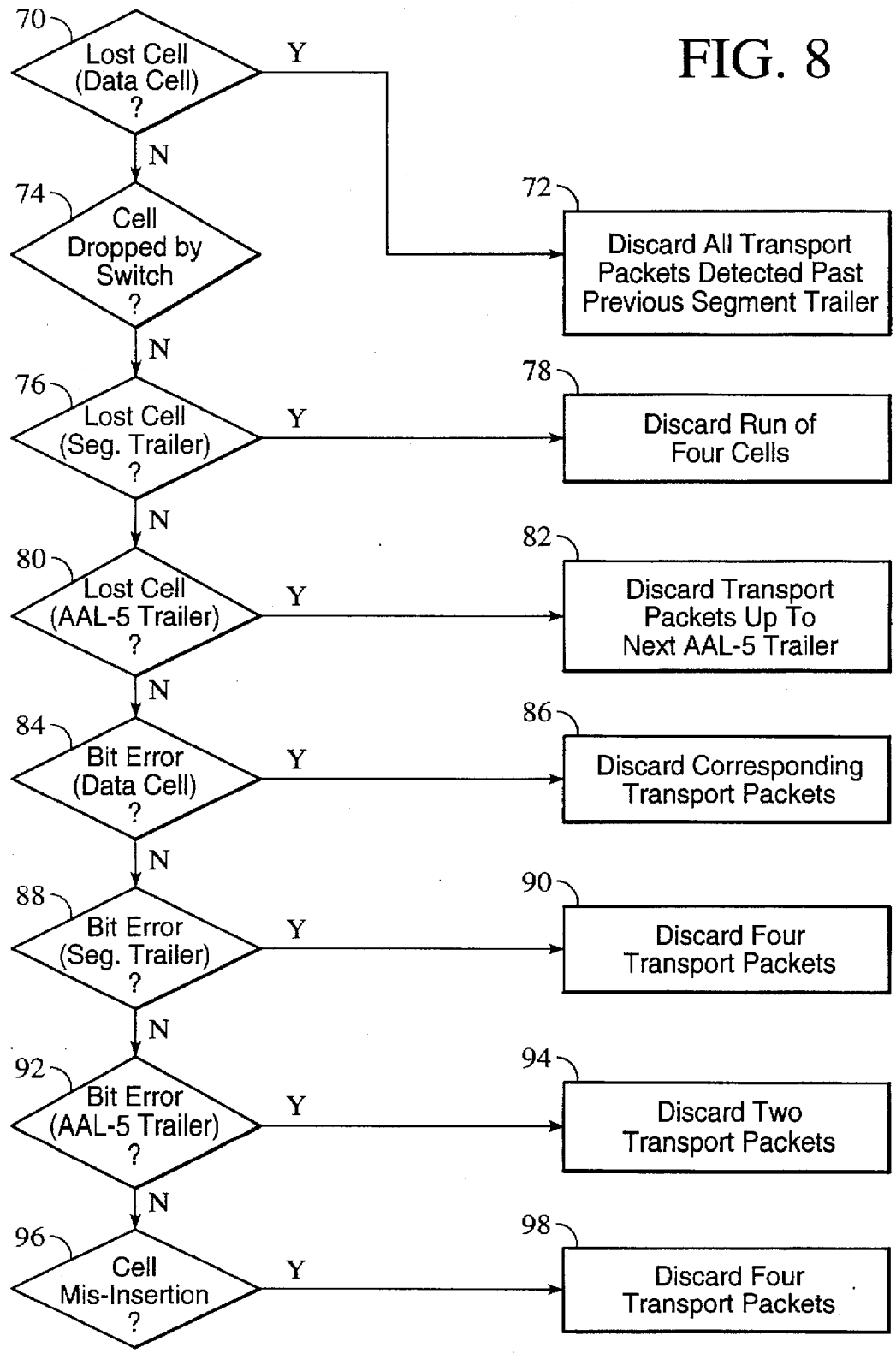
FIG. 8 is a flow chart depicting the process of recovery from different types of cell transmission errors.

FIG. 8 is a flow chart depicting the process of recovery from different types of cell transmission errors once discovered by the decoder 28. If a cell carrying data is lost in step 70, the decoder 28 will fail to find a valid checksum when it expects a segment trailer 52, but finds instead the first cell of the next transport packet 30. In a preferred embodiment of the present invention, the decoder 28 is programmed to detect a plausible segment trailer 52 in the cell preceding the MPEG-2 synch byte. Therefore, the decoder 28 resets its checksum there and discards the transports packets detected past the previous segment trailer 52 in step 72. This would result loss of only two transport packets 30.

Using conventional methods, in contrast, the decoder 28 would re-synch, have a checksum failure after the next two transport packets 30 (and thus discard them also), reset its running checksum, and recover. This results in a total loss of 4 transport packets.

If a cell is dropped within the switch 16 in step 74, there is no possibility of recovering the lost cells. However, with proper QOS control and better switching design, constant bit rate MPEG-2 streams could reserve enough network bandwidth and avoid traffic congestion through networks. The chance of losing cells in bursts then becomes negligible.

If a cell containing a segment trailer 52 is lost in step 76, there is no possibility of recovering after losing only two transport packets 30. In this case, the decoder 28 must discard the run of four cells in step 78.

If a cell containing an AAL-5 trailer 38 is lost in step 80, the decoder 28 can re-synch at the beginning of the next AAL-5 PDU 32, discard the first and second pair of transport packets 30 (because of checksum mismatch) and then recover in step 82. This results in a loss of four transport packets.

If a bit error occurs in a data cell in step 84, the checksum will be incorrect at the next segment trailer 52. Therefore, the decoder 28 will discard the pair of corresponding transport packets 30 in step 86, reset to the received checksum, and recover with the loss of two transport packets 30.

If a bit error occurs in CRC 46 of a segment trailer 52 in step 88, the decoder 28 will erroneously reset its running checksum, and then have another checksum failure (and reset it), thus discarding four transport packets in step 90.

If a bit error occurs in an AAL-5 trailer 38 in step 92, the last two transport packets 30 will be discarded in step 94, but the decoder 28 will know that the end of the PDU 32 had been reached, and will reset its checksum and count to zero; the next PDU 32 will be received OK, for a total loss of two transport packets 30.

If a cell misinsertion error is detected in step 96, the decoder 28 will inspect the wrong packet for a segment trailer 52, and have to re-synch, and discard four transport packets 30 in step 98. Thus, the nTP-Loose scheme of the present invention loses at worst only twice as much data for a comparable error.

The placement of PCR timestamps needs to be considered also. The MPEG-2 standard says that the PCR is the intended arrival time of the byte containing the last bit of the PCR base. As stream-mode and message-mode decoders work on their data at different times, it may seem that there needs to be some restriction on the placement of PCR. However, this is not believed to be the case because a message-mode (software) decoder, as detailed above, is basically adding a full PDU-buffering delay to the connection, whereas a stream-mode decoder adds only a two-packet delay. In either case, the received transport packets are presented to the MPEG-2 hardware as a continuous stream, and the PCR values are interpreted then.

The nTP-Loose scheme is capable of packing (n) MPEG-2 transport packets 30 into a AAL-5 PDU 32. The choice of number (n) of MPEG-2 transport packets 30 is platform dependent. As described in FIG. 1, the software and hardware components involve information retrieval from storage, interaction with operating system, system bus, I/O bus, and interface cards, transmission across networks, and decoding processing of MPEG-2 transport streams. A careful examination of each component may be required to decide the optimal number (n) for each platform.

If the decoder 28 is software-based, the larger the PDU size the better the transmission performance will be across the network 12. However, the maximum performance will be limited by several factors such as the CPU speed, I/O bus, and network media. There is no dramatic performance gain above a certain PDU size.

To examine the effect of packing different numbers of MPEG-2 transport packets 30 into one AAL-5 PDU 32, Applicants used a prototype ATM network based on the Power Macintosh platform. The ATM test environment was similar to that shown in FIG. 1 in that it included two Power Macintosh computers interconnected by two Fore Systems' NBA-200 interface cards, except that in the test environment, the interface cards were connected in a point-to-point connection. No switch was involved.

The following is description of the hardware components in the prototype network. Each Power Macintosh ran the Macintosh System 7.5 operating system and included 32 MBytes memory. The Power Macintosh 6100/60 (with 60 MHZ clock), 7100/66 (with 66 MHZ clock), and 8100/80 (with 80 MHZ clock) computers represent the first generation of Reduced Instruction Set Computing (RISC) using the PowerPC 601 microprocessor.

Figure 9:
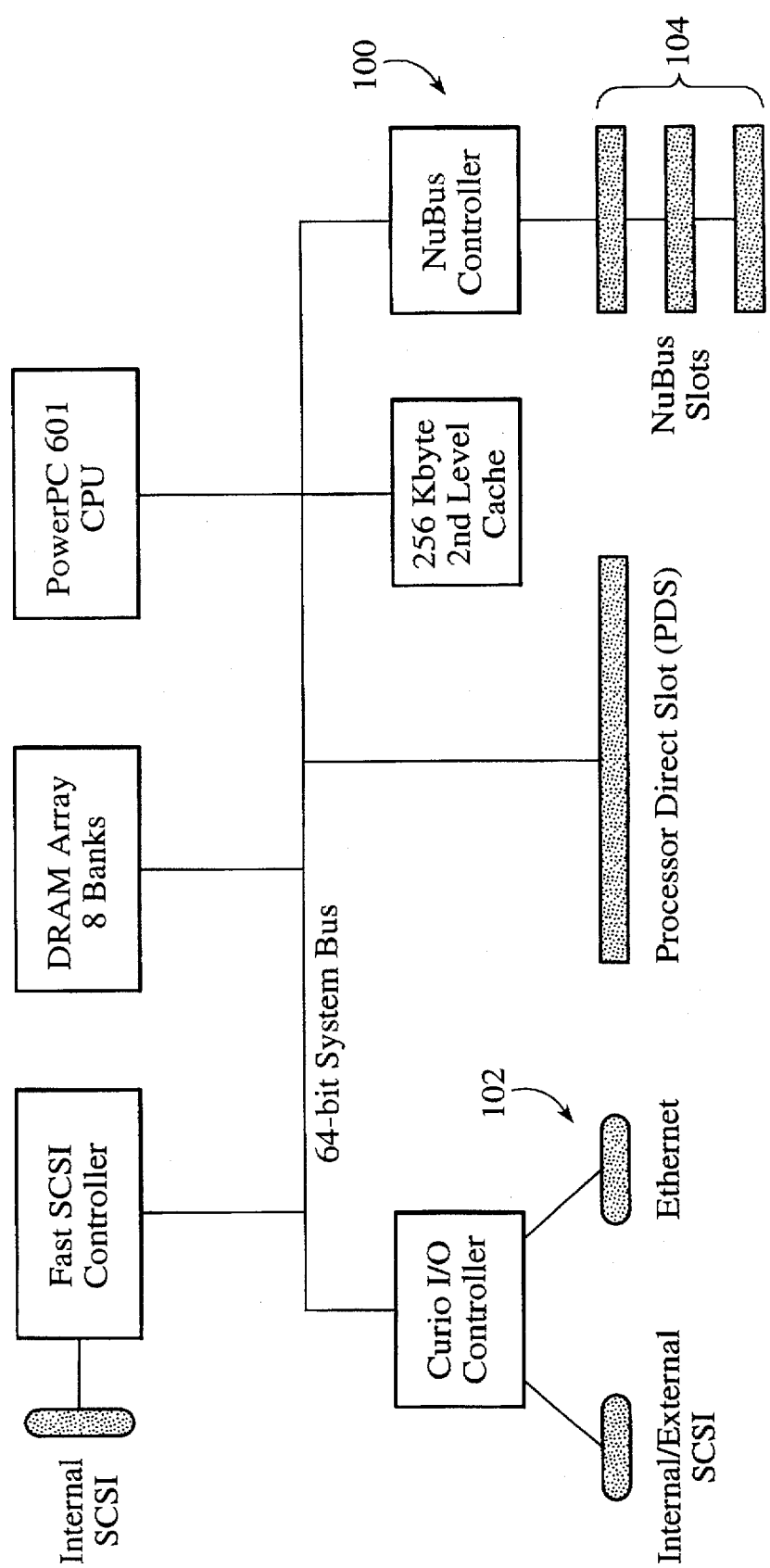
FIG. 9 is a simplified block diagram of a Power Macintosh.

FIG. 9 is a simplified block diagram of a Power Macintosh. Principal I/O hardware features of the Power Macintosh include provision for NuBus 100 and processor-direct expansion cards, built-in Ethernet support 102, built-in Geoport support (compatible with most telephone system), high-quality and 16-bit stereo sound input and ouTPut. For Power Macintosh 8100/80, three NuBus slots 104 are available. NuBus ATM interface cards can provide ATM capability for Power Macintosh computers.

The NuBus interface in Power Macintosh computers provides access between the system bus and plug-in cards. NuBus is a 32-bit wide bus with a 10 MHZ clock for synchronizing bus arbitration and transfer of read/write data to a 32-bit address space. NuBus supports only read and write operations in a single address space, in contrast to some other bus designs. I/O and interrupts may be accomplished within these read and write mechanisms. In the Macintosh computers with NuBus, however, interrupts are detected through the nonmaster request line. The Macintosh computers were equipped with Fore Systems' NBA-200 ATM interface cards for the NuBus.

Figure 10:
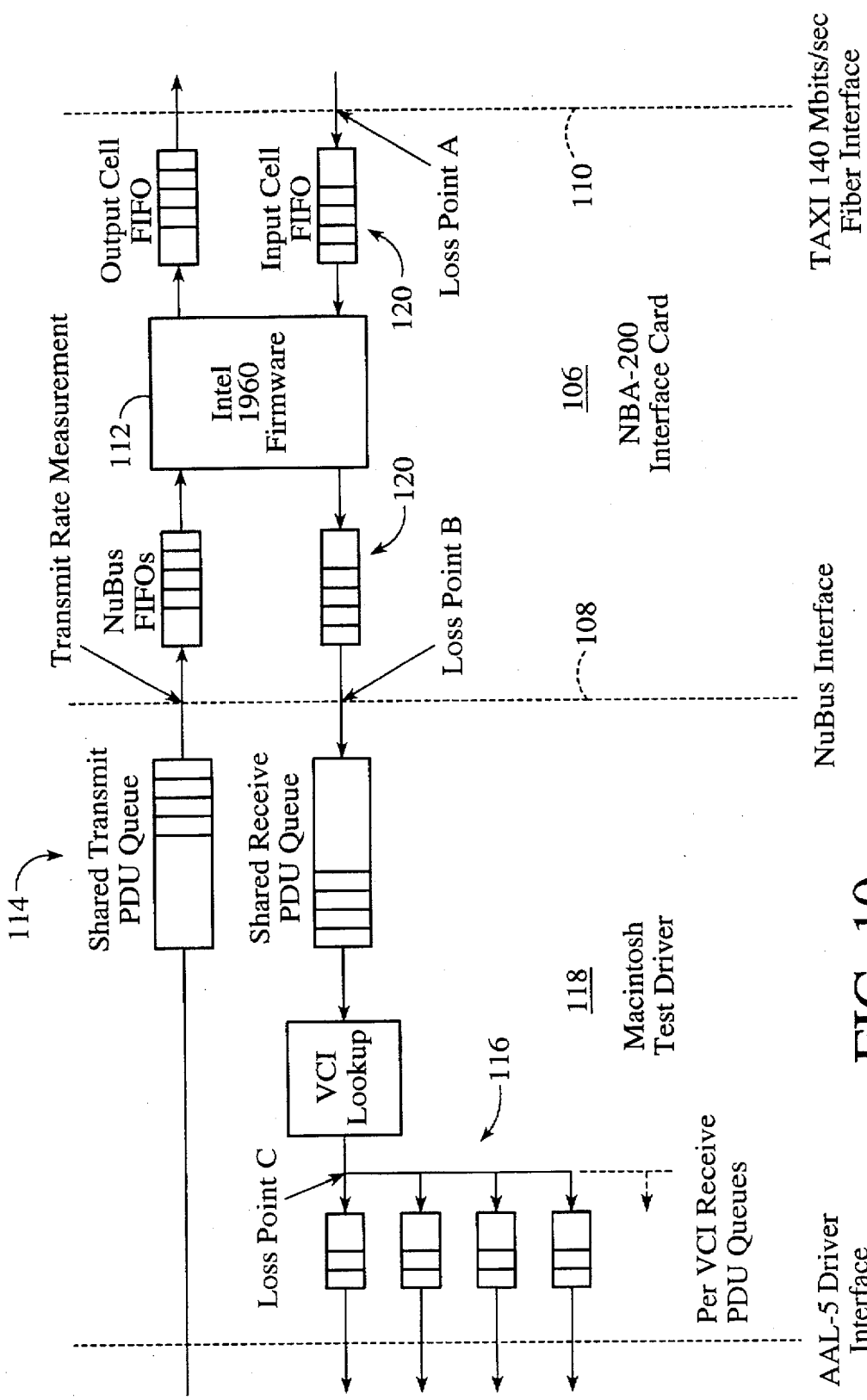
FIG. 10 is a block diagram depicting the physical interface between an interface card and a NuBus interface.

FIG. 10 is a block diagram depicting the physical interface between the interface card 106 and the NuBus interface 108. The physical media for interface cards is the 140 Mbits/sec TAXI interface 110 (FDDI fiber plant and signal encoding scheme).

The Series-200 ATM interface card uses an Intel i960 as an onboard processor 112. The i960 takes over most of the AAL and cell related tasks including the SAR functions for AAL 3/4 and AAL 5, and cell multiplexing. With the Series-200 interface card 106, the host interfaces at the AAL PDU level feeds lists of outgoing packets and incoming buffers to the i960. The i960 uses local memory to manage pointers to packets, and uses DMA (Direct Memory Access) to move cells out of and into host memory. Cells are never stored in adapter memory.

FIG. 10 also shows several significant queues involving transmitting and receiving packets. They include shared transmit/receive PDU queues 114 and per VCI PDU queues 116 within a test driver 118, and NuBus FIFOs 120 and Cell FIFOs within the NBA-200 interface card 106. The test driver 118 was written to tests the transmission and receiving capability of Fore's NBA-200 interface card 106. The driver 118 implemented DMA, per VPI/VCI processing, buffer management, and statistics collection of transmission and receiving. There is no additional data copying within the test driver 118.

During the performance test, one Power Macintosh served as the sender and the other as the receiver.

Figure 11:
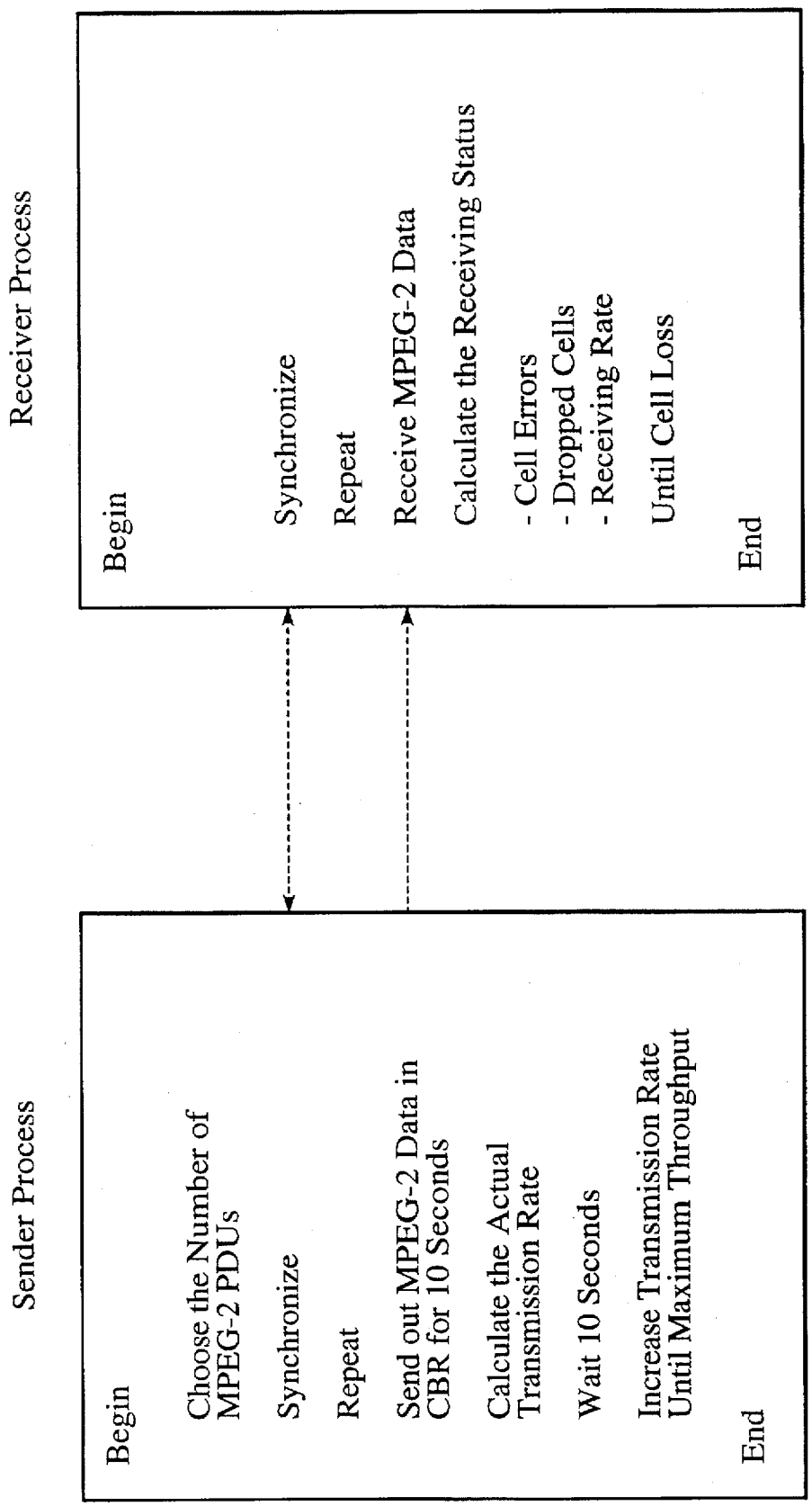
FIG. 11 is a detailed diagram of sender and receiver processes in a test platform.

FIG. 11 is a detailed diagram of the sender and receiver processes. First, the number (n) of MPEG-2 transport packets to pack into one PDU 32 was chosen. The number of MPEG-2 transport packets within one ATM AAL-5 PDU 32 was varied from one (188 bytes) to forty-four (8272 bytes).

After synchronizing, the sender transmitted MPEG-2 data at a predefined constant bit rate for ten seconds (called one transmission phase). The main reason of using CBR data flow at the sender side was to simulate CBR encoded MPEG-2 streams. To ensure the required constant bit rate within one transmission phase, a certain amount of delay is enforced between two consecutive sending operations.

The processes was repeated with increasing transmission rates until maximum throughput was attained. This throughput is defined as the maximum transmission throughput without packet error/loss. The rate is measured at the NuBus interface.

The receiver collected the data arrival statistics for each transmission phase. Between two transmission phases, the sender would wait for ten seconds to avoid interference and allow receiver to collect required statistics. The sender process was terminated once the sender process reached the maximum transfer rate of the host machine, or the receiver could not handle excessive PDUs sent by the sender because of cell error/loss.

Figure 12:
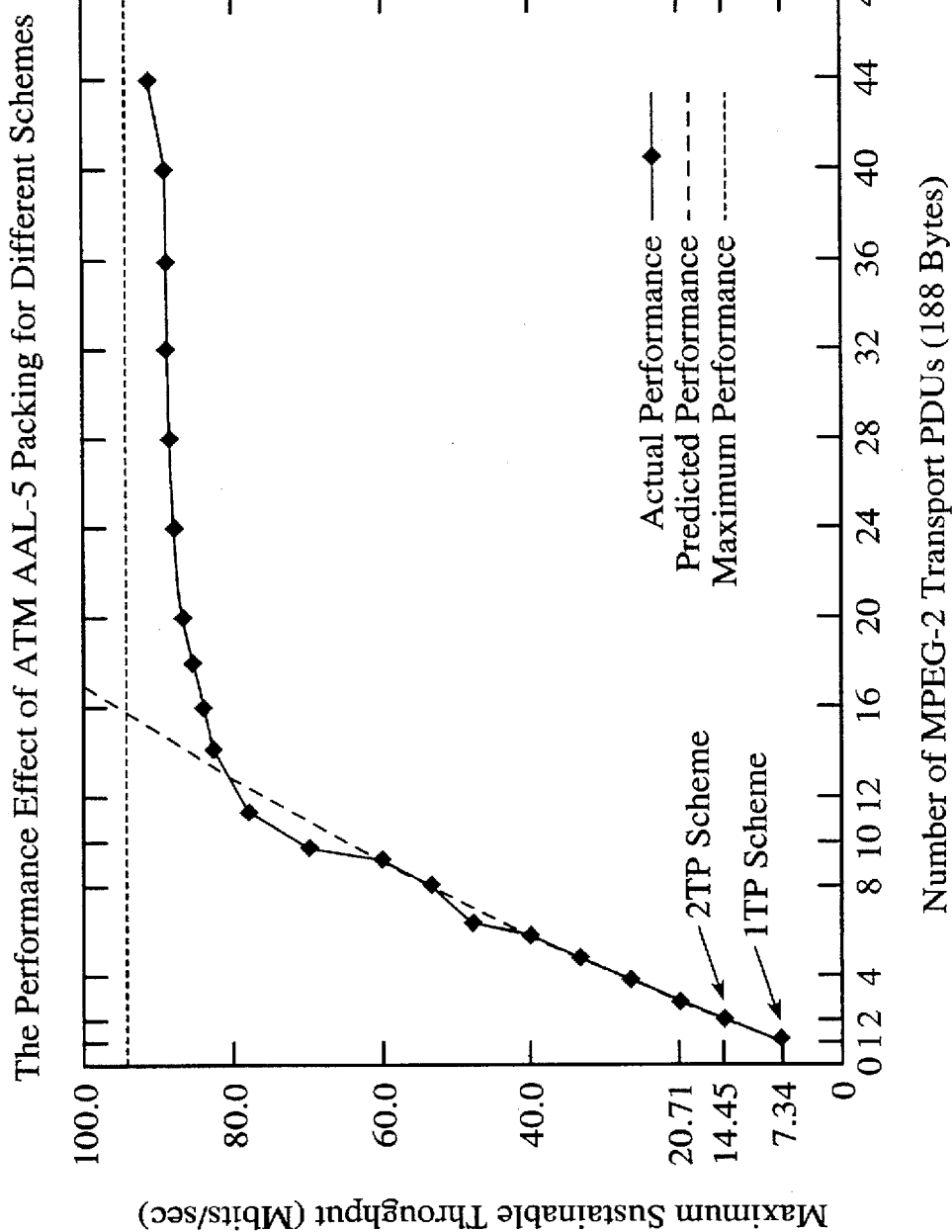
FIG. 12 is a graph depicting the performance results when different number of MPEG-2 transport packets are packed into an AAL-5 PDU.

Referring to FIG. 12, the performance results of using different number of MPEG-2 transport packets (from one to forty-four MPEG-2 transport packets) is shown. The maximum sustainable throughput (MST) of sender is the Y-axis and number of the MPEG-2 transport packets in one AAL-5 PDU is the X-axis.

The performance figure shows a linear relation for using small number of MPEG-2 transport packets and a saturated performance for using larger number of MPEG-2 transport packets. The predicted performance is computed based on the 1TP and 2TP packing schemes. A linear relation is assumed. The purpose of the predicted performance is to show the best cases for larger PDU sizes when communication performance can be scaled.

The maximum performance that has been observed on the NuBus is about 95 Mbits/sec. In this case, 91.88 Mbits/sec throughput was observed for packing 44 MPEG-2 transport packets.

For the 1TP scheme, the MST is about 7.34 Mbits/sec. Since the PDU is too small, the receiver starts losing PDUs when the sender sends out over 4879 AAL-5 PDUs per second.

For the 2TP scheme, the MST is about 14.45 Mbits/sec. The receiver starts losing PDUs when the sender transmits more than 4803 AAL-5 PDUs per second (half of the MPEG-2 transport packets transmitted).

The performance of the nTP-Loose scheme of the present invention with varying numbers of (n) is shown by the connected series of dots. For small AAL-5 PDU sizes (n<10 in the test platform), the MST is dominated by the machine capacity of number of AAL-5 PDUs the receiver is able to handle. Fixed amount of processing overhead is associated with each arrival of a PDU, the CPU can only handle certain number of PDUs. When observing excessive transmission rate over its capacity, the receiver will start losing packets.

For larger AAL-5 PDU sizes (n>10), the MST is dominated by the NuBus performance. In the test platform, throughput close to 90 Mbits/sec is observed for cases of n>24. At the receiving side, no cell error/loss is observed (i.e., no matter how fast the sender transmit data, no data was lost on the receiving side).

Based on the performance figure of the experiment, there is no significant performance gain for the cases of n>12. The MST of the cases of ten and twelve MPEG-2 transport packets are 70.36 and 78.98, respectively. Therefore, in a preferred embodiment of the packing scheme using Power Macintosh ATM networks, a buffer size of 1880 or 2256 bytes (10 or 12 MPEG-2 PDUs) is used.

Given this high communication performance, fast forward and backward playing of MPEG-2 movies, which require several times the normal video display speed, can be easily achieved via ATM networks. If not, additional software processing time is required to decode and throw away intermediate frames. It certainly causes additional delay and processing overhead on the sender/server machine.

The performance figure reported here represents the prototype performance of a special ATM configuration. This performance will change based on additional software for MPEG processing. Also, the performance reported here is based on a prototyping of software components and does not necessarily represent the final performance of the Power Macintosh computers. Different ATM platforms will require different buffer sizes. However, larger buffer sizes (around 1 or 2 Kbytes) usually represents a better choices than 1TP or 2TP schemes.

The nTP-Loose scheme can be applied to other ATM platforms in general. The test ATM platform should provide a systematic way to analyze I/O characteristics of other ATM platforms. In normal cases, one Kbyte or two Kbyte buffer is required to reach a better packing performance.

A method and system for packing a certain number of CBR encoded MPEG-2 transport packets into one ATM AAL-5 PDU has been disclosed. The nTP-Loose scheme of the present invention yields better end-to-end performance than conventional 1TP and 2TP schemes, yields better error recovery capability than the nTP-Tight scheme, and has the same buffer requirements as the 2TP scheme.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for encoding a stream of first data packets over a network, the network transmitting data in second data packets whose size is significantly larger than the first data packets, the method comprising the steps of:

(a) packing a plurality of first data packets into a single second data packet;

(b) inserting a segment trailer into the single second data packet after at least two first data packets; and (c) inserting a trailer at the end of the single second data packet.

2. A method as in claim 1 wherein the first data packets are MPEG packets.

3. A method as in claim 2 wherein the network is an ATM network and the single second data packet is an ATM packet.

4. A method as in claim 3 further including the steps of:

(d) transmitting the ATM packet over the ATM network;

(e) receiving the ATM packet; and (f) extracting the plurality of MPEG packets from the ATM packet.

5. A method as in claim 4 wherein step (b) further includes the step of:

(b1) providing the segment trailer with a Cyclic Redundancy Check (CRC) field.

6. A method as in claim 5 wherein step (f) further includes the step of:

(f1) recovery from transmission errors using the CRC field in the segment trailer.

7. A method as in claim 6 wherein the MPEG packet is a MPEG-2 transport packet.

8. A method as in claim 7 wherein the ATM network includes an AAL-5 protocol layer and wherein the ATM packet is an AAL-5 Protocol Data Unit.

9. A method as in claim 8 wherein step (a) further includes the step of:

(a1) packing ten to twelve MPEG-2 transport packets into the AAL-5 Protocol Data Unit.

10. A system for supporting MPEG-2 data streams over a multimedia ATM network, the ATM network including a file server for providing audio and video data to a requesting client, wherein the MPEG-2 data streams comprise MPEG-2 transport packets, and wherein the ATM network transmits ATM Protocol Data Units (PDUs), the system comprising:

means for packing a plurality of MPEG-2 transport packets into one ATM PDU;

means for inserting a segment trailer into the ATM PDU after at least two MPEG-2 transport packets; and means for inserting an ATM trailer at the end of the ATM PDU.

11. A system as in claim 10 further including:

means for transmitting the ATM PDU from the file server to the requesting client;

means for receiving the ATM PDU; and means for extracting the plurality of MPEG-2 transport packets from the ATM PDU.

12. A system as in claim 11 wherein the MPEG-2 data stream is constant bit rate bit rate encoded.

13. A system as in claim 12 wherein the segment trailer includes a Cyclic Redundancy Check (CRC) field.

14. A system as in claim 13 wherein the requesting client further includes means for using the CRC field to check for and recover from errors that occur during transmission of the MPEG-2 transport packets in the ATM PDU.

15. A system as in claim 14 wherein the ATM PDU is an AAL-5 Protocol Data Unit.

16. A system for supporting MPEG-2 data streams over a multimedia ATM network that transmits AAL-5 Protocol Data Units (PDUs), the system comprising:

a file server connected to the network for providing audio and video data, wherein the file server stores the audio and video data in the form of MPEG-2 transport packets, the file server including;

means for packing a plurality of MPEG-2 transport packets into one AAL-5 PDU, means for inserting a segment trailer into the AAL-5 PDU after every two MPEG-2 transport packets, means for inserting an ATM trailer at the end of the AAL-5 PDU, and means for transmitting the AAL-5 PDU over the ATM network; and a client computer connected to the ATM network, the client computer including;

means for receiving the PDU from the ATM network, means for extracting the plurality of MPEG-2 transport packets from the AAL-5 PDU, and means for examining the segment trailers in the AAL-5 PDU to check for and recover from transmission errors.

17. A system as in claim 16 further including a ATM network switch to route the AAL-5 PDUs to the client computer.

18. A system as in claim 17 wherein the file server further includes a first ATM network interface card.

19. A system as in claim 18 wherein the client computer further includes a second ATM network interface card, and a MPEG-2 decoder for decoding the MPEG-2 transport packets for playback to a user.

* * * * *